E. C. WILCOX & B. L. LAWTON.
SHOCK ABSORBER.
APPLICATION FILED NOV. 11, 1909.
947,477.
Patented Jan. 25, 1910.
2 SHEETS—SHEET 1.
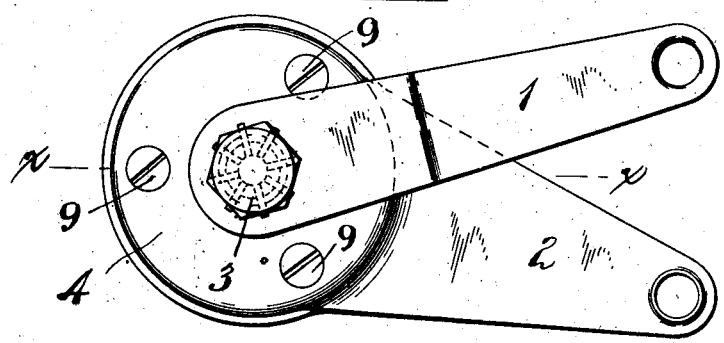
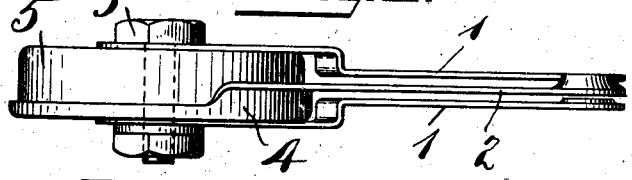
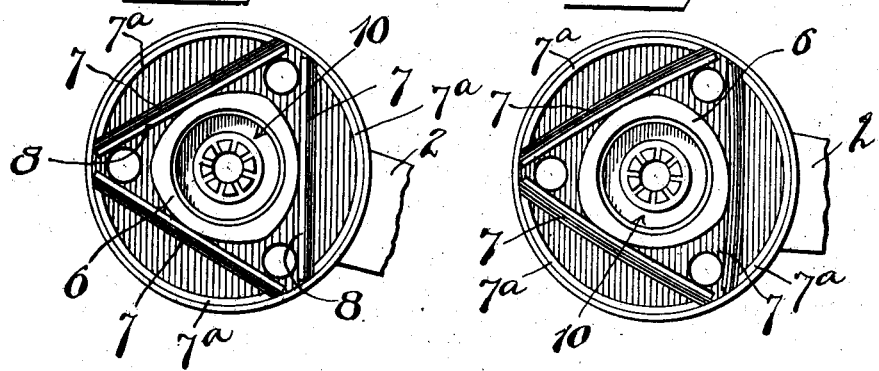
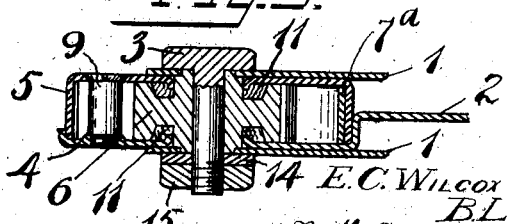
Witnesses:
E. C. Wilcox
B. L. Lawton
Inventors
By their Attorneys E. C. WILCOX & B. L. LAWTON.
SHOCK ABSORBER.
APPLICATION FILED NOV. 11, 1909.
947,477.
Patented Jan. 25, 1910.
2 SHEETS—SHEET 2.
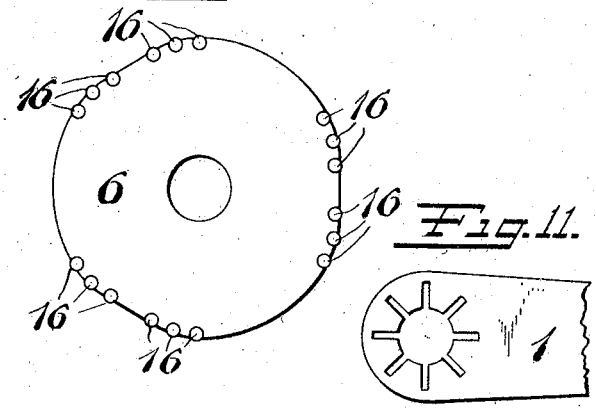
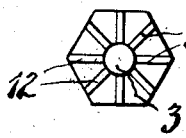
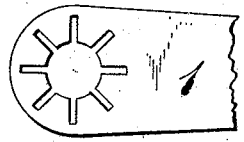
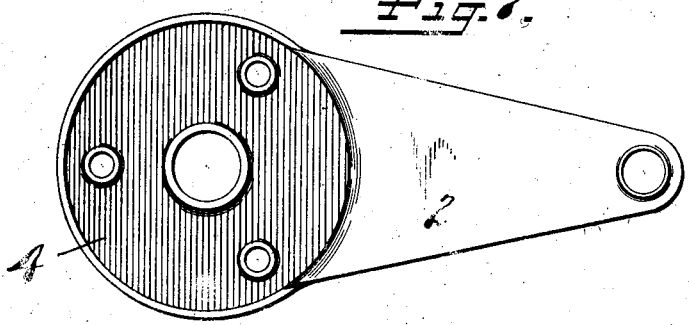
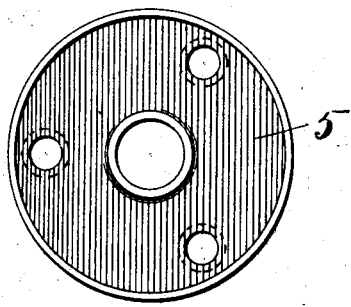
Witnesses:
Inventors
E. C. Wilcox
B. L. Lawton
By their Attorneys

UNITED STATES PATENT OFFICE.

ERNEST C. WILCOX AND BURTON L. LAWTON, OF MERIDEN, CONNECTICUT.

SHOCK-ABSORBER.

947,477.           Specification of Letters Patent.       Patented Jan. 25, 1910.

Application filed November 11, 1909. Serial No. 527,373.

*To all whom it may concern:*

Be it known that we, ERNEST C. WILCOX and BURTON L. LAWTON, citizens of the United States, residing at Meriden, county of New Haven, State of Connecticut, have invented certain new and useful Improvements in Shock-Absorbers, of which the following is a full, clear, and exact description.

Our invention relates to improvements in shock absorbing mechanism for use in connection with vehicles.

The invention has particular utility in connection with high speed road vehicles such as automobiles, the object of the invention being to minimize both shock and recoil, thereby not only producing an easier riding vehicle but reducing the danger of spring breakage.

It is our purpose to improve the mechanical construction in such a manner as to permit these devices to be produced with the greatest economy without sacrificing durability and effectiveness.

In the drawings,—Figure 1 is a side elevation of our invention assembled and in normal position; Fig. 2 is a plan view thereof; Fig. 3 is a detail view of the interior of the case and showing the various parts therein in one position; Fig. 4 is a similar view showing said parts in another position; Fig. 5 is a section on the line *x—x* Fig. 1; Fig. 6 is an end elevation of a modified detail; Fig. 7 is an elevation of the inner side of one part of the case; Fig. 8 is an elevation of the inner side of the other part of the case; Fig. 9 is an edge elevation of a detail; Figs. 10 and 11 are views of details.

In the main the construction comprises an oscillating cam member arranged between a plurality of springs which exert their pressure against the perimeter of said cam member, so that when the latter is turned in either direction to such an extent as to put the springs under tension, the spring resistance serves to check abnormal recoil and abnormal compression of the vehicle or load bearing springs. In other words, the mechanism is double acting. The shock absorbing springs are suitably connected with one part of the vehicle, for example, the body, while the cam element, which co-acts with said springs, is suitably connected with another part of the vehicle, for example, the shaft or axle; said shaft or axle and main body being themselves connected by the usual load carrying vehicle springs. As the wagon body moves up and down relatively to the axle and the load carrying springs are operated, there is a relative rotary movement between the cam and the shock absorbing springs, and these parts are so designed that any abnormal downward movement of the body of the vehicle relatively to the axle, as well as an abnormal upward or recoil movement will be checked. This checking action is accomplished wholly by the resistance of the shock absorbing springs and without friction, the shock absorber being preferably packed with grease or other suitable lubricant, whereby friction and attending wear are avoided. By eliminating friction as a material controlling element, great durability is afforded and (given a cam of definite shape) the efficiency of the shock absorbing apparatus may be carefully and accurately determined in advance since it depends wholly upon the number and strength of the recoil checking springs carried by the shock absorber case.

We are aware that heretofore friction recoil devices of the rotary type as well as the oscillating and reciprocating type are well known but in such devices, friction being depended upon, rapid wear occurs, which quickly modifies the accuracy of the apparatus, shortens its life, and requires constant readjustment and frequent replacement of the parts. Our apparatus operates on a fundamentally different principle in that frictional engagement between the parts is purposely eliminated as far as possible, and in fact so far as to make it of no consequence or value in the checking operation.

In the drawings, which show the preferred form of our invention, 1 is a lever designed to be secured at its free end to the vehicle (for example, to the body); 2 is another lever designed to be secured at its free end to another part of the vehicle (for example to the axle), said body being supported on said axle by a load-carrying spring (not shown). The arms 1 and 2 are hinged together as by a bolt or pin 3. The arm 2 is provided with a circular hollowed-out extension 4 concentric with the axis of bolt 3. This extension 4, in the present instance, constitutes the cap of a circular box or case in which a cam and shock absorbing springs are located. The other part of the box or case is indicated at 5 and is hollowed-out and so shaped as to form, with the cover 4, an inclosed chamber having a central transverse passage in which 5 is rotatably mounted the two end hub extensions of the cam 6. The lever 1 (which is preferably formed of two arms arranged to straddle the case above described) is rigidly connected to the two hub ends of the cam 6, said connection being preferably made in the manner hereinafter described.

It follows from the foregoing that as the free ends of the arms 1 and 2 move toward and from each other, there will be a relative rotation of the cam 6 within the body 5 of the case. In the preferred form of our invention the cam 6 is what we may term a three-point cam.

7—7—7 are springs arranged in the form of a triangle around the cam 6 and within the case 5 whereby a balancing effect is secured, the middle portion of each spring lying adjacent to the periphery of said cam.

7a—7a—7a are saddle blocks arranged within the case 5. Each saddle block is preferably bent in the form of an arc to fit closely against the adjacent inner wall of the case 5, and supports the ends of an adjacent spring 7, whereby the strain of said spring is distributed with substantial uniformity entirely around that part of the case 5 against which said block bears.

9—9 are screws or bolts, which serve to connect the cap 4 and case 5 said screws passing through said case preferably at points within the meeting angles of the spring 7—7—7.

8—8—8 are anti-friction liners which are carried between the springs 7 and the periphery of the cam 6, said liners being provided to minimize wear. In each end of the hub and around the central portion thereof is an annular groove 10 for receiving a packing washer 11 to prevent the escape of grease, or whatever other lubricant may be employed. The parts 4 and 5 of the case so fit one another, and likewise so fit upon the hub of the cam, that, so far as possible, oil or grease tight joints are provided.

A preferred method of securing parts of the lever 1 to the cam 6 comprises at once not only a connecting means, but also an adjusting means whereby the lever members may be set at different angular positions to compensate for differently curved load-bearing springs. To secure this connection we provide in each hub end of the cam 6 a plurality of diametrical slots crossing one another at the axis of the cam. On the under side of the head of the bolt 3 are a corresponding number of radial ribs 12—12 (see Fig. 10). In the edge of the opening in the lever arm 1, in which the hub end is located, are a corresponding number of recesses (see Fig. 11). The length of the ribs 12—12 is sufficient to not only stand in the slots in the hub end but to also project into the adjacent recesses in the arm 1, thus positively keying or locking together one arm of the lever 1 with one end of the cam. The other arm of the lever 1 corresponds to the arm already described and shown in Fig. 11. This second arm is adapted to the other hub end of the cam, and to lock this arm in place a washer 14, having ribs on its under side is employed, said ribs engaging in recesses in the adjacent end of the hub and the surrounding wall of the arm as above described. A nut 15 binds the bolt 3 and washer 14 securely to the hub ends of the cam. By this means both arms of the lever 1 are positively interlocked with the cam 6.

All of the parts, with the exception of the hub and bolts, may be made from sheet metal and in most instances said parts may be struck up and very rapidly produced by means of dies, resulting not only in substantial economy but in great uniformity, whereby interchangeability is possible. The periphery (or active face) of the cam 6 should be ground or polished whereby its contact with the liners 210—10 of the springs 7—7 will be practically frictionless. In order to further guarantee against friction it is preferable that the interior of the case be packed with grease or some other suitable lubricant. In some cases we may desire to employ anti-friction rolls or balls 16—16 (see modification Fig. 6) on the spring engaging parts of the cam 6, but the provision of such anti-friction devices is unnecessary, where the abutting surfaces of the cam and springs 7—7 or liners 10—10 are smooth or polished and where lubricant is employed, as explained.

In the preferred form of the invention we provide a plurality of spring leaves in each spring 7, whereby the resisting power of the spring may be modified by removing or adding a leaf as exigencies require. The low parts of the cam 6 which engage the springs 7—7 (or liners 10—10) are so designed that the arms 1—2 may be moved to and fro to such an extent as would occur while a vehicle (to which the absorber is applied) is traveling over an ordinary road, with but little or no effect upon the springs 7—7. In the event, however, the vehicle encounters a severe jolt tending to abnormally compress the load carrying spring, the cam is so designed that when turned to the extent that would be required under such a condition, it will flex the springs 7—7, which thereupon act to absorb a substantial part of the extra jolt and to that extent relieve the strain on the load carrying spring. On recoil likewise it is only the excessive recoils that are checked since the design of the cam only flexes the spring on the separation of the free ends of the levers 1 and 2 to an extent more than occurs in the normal operation of the absorber, that is, under the normal road conditions.

From the foregoing it will be seen that under normal road conditions (which we might say implies a reasonably good road) the shock absorbing element is performing no work and is undergoing no strain. When, however, a bad piece of road is encountered and the vehicle is subjected to severe jolts, the absorbing device comes into play to the extent of checking abnormal compression and abnormal recoil of the load carrying spring, correspondingly minimizing danger of spring breakage, and adding to the comfort of the occupant of the vehicle. By reason of this arrangement it will be seen that there is little or no wear on the various parts, and the arrangement of the springs is such as to balance the strain upon the hub ends of the cam and equalize the strain in such a manner as to guarantee very slow and uniform wear. While a bearing for the hub ends may be provided by bending down the edge of the cap and case around the central aperture in each part, the edge of each aperture may be bushed, if desired.

In order to secure the effect we have described of substantially no shock absorbing action under normal road conditions, it is merely necessary to form the lower part of the cam upon the arc of a circle struck from the axis of the bolt 3, the high parts only of the cam being designed to resist properly abnormal compression and reaction of the load bearing spring.

It will be seen that the bolts 9—9 not only serve as a means for effectively securing the parts 4—5 of the case together but also prevent the creeping around of the springs 7—7 and saddles 7ᵃ—7ᵃ within the case 5; indeed, that part of the metal struck in in the forming of the holes to receive the bolts 9—9 may project between the ends of the springs 7—7 so as to operate as a means to prevent said springs from creeping around. It should be understood, of course, that the shape of the cam may be modified to a substantial extent, the shape indicated in the drawings being illustrative rather than definitive.

What we claim is:

1. A shock absorber, comprising two relatively rotatable parts, one part comprising a cam, the other part comprising a case surrounding and supporting said cam, a lever carried by each part and projecting laterally therefrom, said cam having a plurality of high points, a corresponding number of springs arranged and held within the case, each spring bearing against said cam between two of said high points and arranged to be operated by both of said high points.

2. A shock absorber comprising two relatively rotatable parts, one part comprising a cam, the other part comprising a case surrounding and supporting said cam, a lever carried by each part and projecting laterally therefrom, said cam having three high points arranged equidistant, three springs arranged in triangular form around said cam, each spring coöperating with said cam at a point between two of the high points thereon and being arranged to be operated by either of said high points.

3. A shock absorber comprising two relatively rotatable parts, one part comprising a cam, the other part comprising a case surrounding and supporting said cam, a lever carried by each part and projecting laterally therefrom, said cam having three high points arranged equidistant, three springs arranged in triangular form around said cam, each spring coöperating with said cam at a point between two of the high points thereon and being arranged to be operated by either of said high points, and means to prevent said springs from moving around in said case.

4. A shock absorber comprising two relatively rotatable parts, one part comprising a cam, the other part comprising a case surrounding and supporting said cam, a lever carried by each part and projecting laterally therefrom, said cam having three high points arranged equidistant, three springs arranged in triangular form around said cam, each spring coöperating with said cam at a point between two of the high points thereon and being arranged to be operated by either of said high points, and means to prevent said springs from moving around in said case, said means comprising pins passing transversely through the case and between the ends of adjacent springs.

5. A shock absorber comprising two relatively rotatable parts, one part comprising a cam, the other part comprising a two-part circular case surrounding and supporting said cam, a lever carried by the cam and another lever carried by the case for operating said parts, said cam having three high points, the perimeter of said cam being smooth, three springs arranged on the three sides of said cam to center and balance the same, each of said springs co-acting with two of the high points on said cam.

6. A shock absorber comprising two relatively rotatable parts, one part comprising a cam, the other part comprising a two-part circular case surrounding and supporting said cam, a lever carried by the cam and another lever carried by the case for operating said parts, said cam having three high points, the perimeter of said cam being smooth, three springs arranged on the three sides of said cam to center and balance the same, each of said springs co-acting with two of the high points on said cam, and pins for securing the two parts of the case together, said pins holding said springs from displacement within said case.

7. In a shock absorber, a circular sheet metal case comprising two parts, both of said parts being hollowed out, one part overlapping and fitting the other to form a closure for the same, a central perforation in each of said parts, a cam arranged within the case, said cam having a hub extension at each end, said hub extension taking a bearing in the perforation in the adjacent part of the case, a plurality of springs held within the case and coöperating with the cam, a plurality of high points on the cam, each spring coöperating with two of said high points, all of the joints between said parts being substantially grease-tight whereby said case may be packed with a suitable lubricant.

8. In a shock absorber, a circular sheet metal case comprising two parts, both of said parts being hollowed out, one part overlapping and fitting the other to form a closure for the same, a central perforation in each of said parts, a cam arranged within the case, said cam having a hub extension at each end, said hub extension taking a bearing in the perforation in the adjacent part of the case, a plurality of springs held within the case and coöperating with the cam, a plurality of high points on the cam, each spring coöperating with two of said high points, all of the joints between said parts being substantially grease-tight whereby said case may be packed with a suitable lubricant, said grease-tight joints including a packing washer between the cam and case.

9. In a shock absorber, a sheet metal case comprising two parts, one of said parts fitting within the other, a lever integrally connected with the outermost part of said case, a central passage through both parts of the case, a cam having oppositely extending hubs mounted in the central passage of said case, said cam having a plurality of high points, a lever connected to the hub of said cam, and springs arranged and held within the case against displacement, each of said springs being arranged to co-act with said cam and to be operated by at least two of the high points thereof.

10. In a shock absorber, a sheet metal case comprising two parts, one of said parts fitting within the other, a lever integrally connected with the outermost part of said case, a central passage through both parts of the case, a cam having oppositely extending hubs mounted in the central passage of said case, said cam having a plurality of high points, a lever connected to the hub of said cam, and springs arranged and held within the case against displacement, each of said springs being arranged to co-act with said cam and to be operated by at least two of the high points thereof, that part of the cam bearing against each spring when the parts are under normal operation being so shaped as to exert a substantially uniform pressure against said springs whereby under normal action no substantial resistance is offered to the relative rotary movement of the cam within the case.

11. In a shock absorber, a case, a cam mounted therein and rotatable relatively thereto, said cam having at least three high parts, those parts of the cam approximately midway between said high parts being shaped substantially to the arc of a circle concentric with the axis of the cam, three springs arranged around said cam to centralize and balance the same, said springs normally co-acting with those parts of the cam shaped to substantially the arc of a circle whereby said cam may be rotated to a substantial extent without substantially operating said springs and whereby only abnormal rotation of said cam within the case will operate said springs.

12. In a shock absorber, a case, a cam mounted therein and rotatable relatively thereto, said cam having at least three high parts, those parts of the cam approximately midway between said high parts being shaped substantially to the arc of a circle concentric with the axis of the cam, three springs arranged around said cam to centralize and balance the same, said springs normally co-acting with those parts of the cam shaped to substantially the arc of a circle whereby said cam may be rotated to a substantial extent without substantially operating said springs and whereby only abnormal rotation of said cam within the case will operate said springs, and means for retaining a lubricant within the case to lubricate the contacting surfaces between said cam and springs.

13. In a shock absorber, a circular case composed of two parts, one part being hollowed out, the other part operating as a cap or closure therefor, a central passage through said case, a cam mounted in said central passage, said cam having at least three high parts, a lever secured to the case and another lever secured to the cam, whereby said parts may be rotated relatively to each other, three flat springs held within said case and arranged adjacent to the periphery of the cam and normally engaging the low parts thereof and exerting a centering effect upon the cam and case, said cam being shaped to substantially flex said springs only when said cam and case are abnormally rotated relatively to each other.

14. In a shock absorber, a cam having at least three high points, a lever extending therefrom, a case surrounding said cam and arranged to hold a lubricant therein, a lever projecting from said case, flat springs within said case and provided in a number corresponding to the number of high points on said cam and normally co-acting with said cam at points substantially midway between the high points thereof, and serving to centralize said cam within the case to relieve the strain upon the bearing between the cam and case.

ERNEST C. WILCOX.
BURTON L. LAWTON.

Witnesses:
V. M. KOOREMAN,
C. M. BARTLETT.